United States Patent [19]
Takahashi et al.

[11] Patent Number: 4,897,748
[45] Date of Patent: Jan. 30, 1990

[54] MAGNETIC HEAD FOR AZIMUTH RECORDING IN A HIGH DENSITY MAGNETIC RECORDING SYSTEM

[75] Inventors: Ken Takahashi, Suita; Hiroshi Yohda, Hirakata; Nobuyuki Kaminaka, Neyagawa, all of Japan

[73] Assignee: Matsushita Electric Industrial Co., Ltd., Osaka, Japan

[21] Appl. No.: 175,241

[22] Filed: Mar. 30, 1988

[30] Foreign Application Priority Data

Apr. 3, 1987 [JP] Japan ................................. 62-83220

[51] Int. Cl.$^4$ ............................................. G11B 5/147
[52] U.S. Cl. ................................................. 360/126
[58] Field of Search .............................. 360/126, 127

[56] References Cited

U.S. PATENT DOCUMENTS

| | | | |
|---|---|---|---|
| 3,365,709 | 1/1968 | Gooch | 360/126 |
| 3,673,353 | 6/1972 | Tiemann et al. | 360/126 |
| 4,156,882 | 5/1979 | Delagi et al. | 360/126 |
| 4,769,729 | 9/1988 | Kumasaka et al. | 360/126 |

*Primary Examiner*—Robert S. Tupper
*Attorney, Agent, or Firm*—Wenderoth, Lind & Ponack

[57] ABSTRACT

A magnetic head for the video tape recorder of azimuth recording type, which features an improved S/N ratio in the overwrite region and assures a high picture quality has a magnetic core for defining a magnetic gap in this head which is made of a plurality of magnetic materials differing in saturation flux density in the direction of track width, with the material having a higher saturation flux density being disposed on the overwriting side of the head. This arrangement permits recording to a greater depth than the depth of magnetization by previous recording to assure an improved picture quality with a higher S/N ratio.

2 Claims, 2 Drawing Sheets

4,897,748

MAGNETIC HEAD FOR AZIMUTH RECORDING IN A HIGH DENSITY MAGNETIC RECORDING SYSTEM

BACKGROUND OF THE INVENTION

1. Field of the Invention

The present invention relates to a magnetic head suitable for high density magnetic recording systems such as video tape recorders.

2. Brief Description of the Prior Art

The video tape recorder as a typical high density magnetic recording system has been remarkably improved in recording density to meet size reduction and longer playing needs. Particularly in regard to the head-tape system, efforts for technological innovation have been largely focused on the implementation of shorter wavelengths of recording signals and narrower recording track widths. Particularly, the development of azimuth recording for increasing the track density has contributed considerably to increased recording density, and this technique has been utilized in the great majority of video tape recorder models available today. FIG. 5 is a perspective view showing a typical video head used in azimuth recording and FIG. 6 is a plan view of the head as viewed from the tape sliding surface. For example, a magnetic gap 12 is defined by magnetic cores 11, 11', which may be made of ferrite, for instance, and the plane of the gap is inclined at an angle of $\theta$ with respect to the plane perpendicular to the direction of head travel (which is parallel to the lateral sides of the head). In the video tape recorder, the recording and reproduction of video signals are performed by a pair of video heads mounted at an interval of 180 degrees on a revolving cylinder. For azimuth recording, the azimuth angles of these two heads are disposed symmetrically with respect to the plane perpendicular to the direction of head travel. Therefore, even when the head scans the adjacent track, the signal in the adjacent track is attenuated by azimuth loss so that substantially no cross-talk is generated. In addition, the width of the guard band between two adjacent tracks can be decreased and in certain cases a high area density can be implemented even without a guard band.

While video tape recorders having a long-playing mode with a slow tape traveling speed have been introduced in recent years to cope with the increasing number of long programs and for the reduction of tape costs, these recorders are generally so designed that the two modes can be used interchangeably to prevent degradation of picture quality on the long-playing mode and for quick interchangeability with the standard mode. To implement both modes in a single video head, the track width of the video head must be selected in such a manner that the picture quality on the standard mode will be preserved as much as possible and, yet, the influence of the immediately adjoining or next adjoining track signal on the long-playing mode will be minimized. Generally, however, the track width has to be larger than the track pitch of the long-playing mode. For example, whereas the pitch for the standard mode is 58 $\mu$m and that for the triple play mode is 19.3 $\mu$m in the VHS system, a head track width of 30 $\mu$m is employed. In recording on such a long-playing mode, the recording track width is narrowed to a given width by overwriting a part of the previously recorded track but the erasure residue of the long-wavelength signal in this overwrite area becomes noise so as to reduce the S/N ratio, thus contributing to the degradation of picture quality on the long-playing mode.

SUMMARY OF THE INVENTION

The present invention has as its object to improve the S/N ratio in the overwrite area on the long-playing mode and to provide a magnetic head which assures an improved picture quality.

To accomplish the above-mentioned object, an azimuth recording magnetic head with the plane of its magnetic gap inclined with respect to the plane perpendicular to the direction of head travel is so constructed that at least the magnetic core defining the magnetic gap is constituted by magnetic materials having dissimilar saturation flux densities in the direction of the track width.

By using a core made of magnetic materials differing in saturation flux density in the direction of the track width to define the magnetic gap with the core material having a higher saturation flux density disposed on the overwrite side, recording can be effected to a greater depth than the depth of magnetization by the previous recording with the result the unerased signal residue is drastically reduced and, hence, the picture quality on the long-playing mode is improved.

DESCRIPTION OF THE PREFERRED EMBODIMENT

Figure 1:
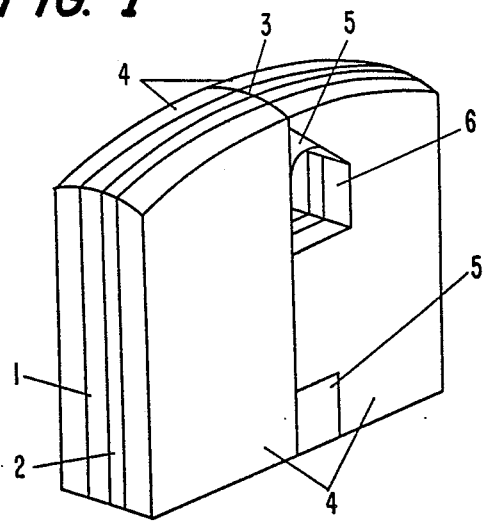
FIG. 1 is a perspective view showing a magnetic head of an embodiment of the present invention.
Figure 2:
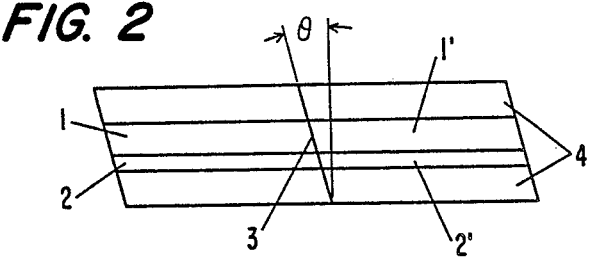
FIG. 2 is a plan view of the same head as viewed from the tape sliding surface.

A perspective view of an embodiment of the invention is presented in FIG. 1 and a plan view of the same as viewed from the tape sliding plane is given in FIG. 2. In the views, 1, 1' each represents a first metallic magnetic layer and 2, 2' each represents a second metallic magnetic layer, and their respective saturation flux densities $B_{s1}$ and $B_{s2}$ have the relationship of $B_{s1} > B_{s2}$.

Such magnetic materials can be easily obtained from an amorphous magnetic alloy or sendust.

Of the head track width, the part constituted by the first metallic magnetic layer corresponds to the track pitch on the long-playing mode and the remainder is constituted by the second metallic magnetic layer.

A magnetic gap 3, defined by the magnetic core, is inclined at an angle of $\Theta$ (azimuth angle) with respect to the plane perpendicular to the direction of head travel. It should be understood that said magnetic core is sandwitched between nonmagnetic substrates 4. Indicated at 5 is a bonding glass used for assuring the gap. The numeral 6 represents a windings window.

Figure 3:
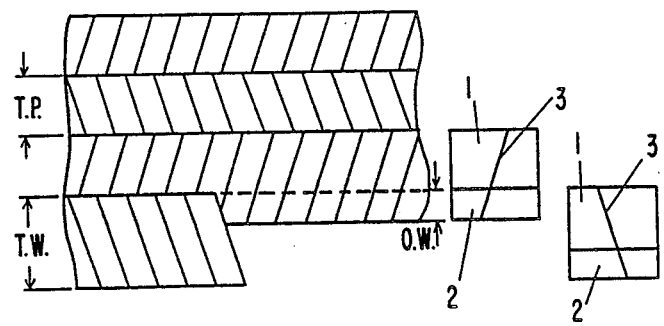
FIG. 3 is a diagram showing the relationship between the recording pattern on the long-playing mode and the head-track position.

FIG. 3 shows the relationship between the head-track position and the recording pattern on the long-playing mode for a magnetic head having the above-described construction. The direction of the shaded lines of recording pattern indicates the azimuth angle of channel 1 or 2. The nonmagnetic substrates of the head are not shown and only the magnetic core defining the head track width is indicated. When the heads for channels 1, 2 of opposite azimuth angles write signals at a track pitch (T.P.) smaller than the head track width (T.W.), the area of T.W.-T.P. of the track in which the other channel head has recorded is an overwrite area (O.W.). Of the head track width defined by the magnetic core, the area corresponding to T.P. is covered by the first metallic magnetic layer and the part corresponding to O.W. by the second metallic magnetic layer. Therefore, the first metallic magnetic layer having a relatively large saturation flux density overwrites on the O.W. area, of the pattern recorded by the head of channel 1, which has been recorded by the second metallic magnetic layer. The recording depth of the long-wavelength signal in this area is greater for channel 2 recording so that the channel 1 signal is almost completely rewritten with a minimum of cross-talk.

For example, the above-described magnetic head may be manufactured by the following procedure. Using a sputtering equipment which can accommodate a plurality of targets in the same vacuum chamber, two kinds of metallic magnetic layers having different saturation flux densities are serially formed, each in the required thickness, on a nonmagnetic substrate and another nonmagnetic substrate is bonded over with glass or the like to give a core segment. Then, this core segment is juxtaposed with another core segment provided with a windings window, through a gap spacer, and the two core segments are bonded together using bonding glass. By the above procedure, a magnetic head as shown in FIG. 1 can be easily obtained.

Even with a single target, metallic magnetic layers having dissimilar saturation flux densities can be serially formed by changing sputtering conditions.

Figure 4:
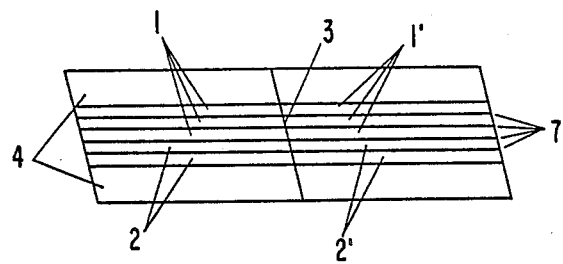
FIG. 4 is a plan view of another embodiment as viewed from the tape sliding surface.
Figure 5:
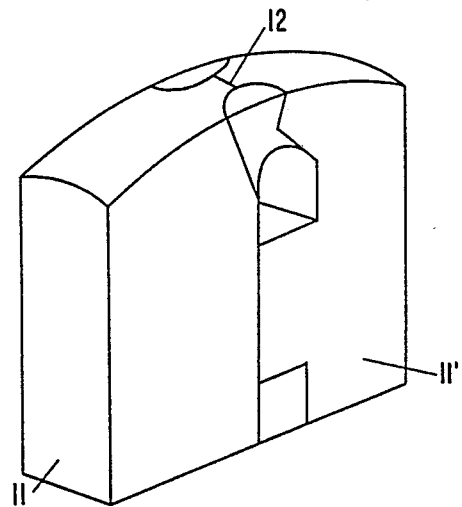
FIG. 5 is a perspective view showing the conventional magnetic head.
Figure 6:
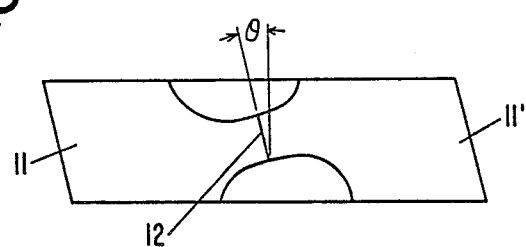
FIG. 6 is a plan view showing the conventional magnetic head as viewed from the tape sliding surface.

While the track width is comparatively large, metallic magnetic materials suffer from eddy current losses at high frequency because of their small resistivities but the magnetic head of the present invention can be assured of a satisfactory high frequency performance by, as illustrated in FIG. 4, dividing each metallic magnetic layer into an appropriate number of sub-layers and interposing an interlayer insulation 7, for example a layer of $SiO_2$, between the sub-layers to provide a laminated magnetic structure.

What is claimed is:

1. A magnetic head for azimuth recording comprising an entire magnetic core which is made of a plurality of layers of magnetic materials differing in saturation flux density in a direction of track width; wherein a layer of a material of said plurality of layers having a higher saturation flux density than that of the other layers of said plurality of layers is disposed at an overwriting side of the magnetic head.

2. A magnetic head as recited in claim 1, wherein each of said plurality of layers of magnetic materials has a laminated structure consisting of a plurality of metallic magnetic sublayers and associated insulating layers.

* * * * *